United States Patent
Raudin et al.

(10) Patent No.: US 9,676,117 B2
(45) Date of Patent: Jun. 13, 2017

(54) METHOD AND DEVICE FOR PRODUCING A PLY INVOLVED IN THE CONSTRUCTION OF A MULTI-PLY PANEL

(75) Inventors: Bruno Raudin, Les Gonds (FR); Pascal Faure, Ugine (FR); Christian Chabrier, La Balme de Thuy (FR)

(73) Assignee: Techniwood International, Maxeville (FR)

( * ) Notice: Subject to any disclaimer, the term of this patent is extended or adjusted under 35 U.S.C. 154(b) by 271 days.

(21) Appl. No.: 14/398,972

(22) PCT Filed: May 9, 2012

(86) PCT No.: PCT/FR2012/051023
§ 371 (c)(1),
(2), (4) Date: Feb. 9, 2015

(87) PCT Pub. No.: WO2013/167813
PCT Pub. Date: Nov. 14, 2013

(65) Prior Publication Data
US 2015/0233117 A1  Aug. 20, 2015

(51) Int. Cl.
*B29C 65/00* (2006.01)
*B27M 3/00* (2006.01)
*E04C 2/30* (2006.01)
*E04C 2/284* (2006.01)
*E04C 2/24* (2006.01)

(52) U.S. Cl.
CPC ......... *B27M 3/0053* (2013.01); *B29C 66/435* (2013.01); *B29C 66/834* (2013.01); *E04C 2/24* (2013.01); *E04C 2/243* (2013.01); *E04C 2/284* (2013.01); *E04C 2/30* (2013.01); *Y10T 156/1092* (2015.01); *Y10T 156/1744* (2015.01)

(58) Field of Classification Search
CPC ..... B27M 3/0053; B27M 3/0026; E04C 2/24; E04C 2/243; B29C 66/435; B29C 66/834; Y10T 156/1089; Y10T 156/1092
USPC ........................................ 156/558; 144/245.2
See application file for complete search history.

(56) References Cited

U.S. PATENT DOCUMENTS 647,056 A    4/1900  Ward
1,693,606 A * 12/1928  Jones ................... B27M 3/0053
                                              144/242.1

(Continued)

FOREIGN PATENT DOCUMENTS

FR           1246469 A    11/1960

*Primary Examiner* — John Goff
(74) *Attorney, Agent, or Firm* — Andrew W. Chu; Craft Chu PLLC

(57) ABSTRACT

There is a method for producing a ply involved in the construction of a multi-ply panel for constructing or adding to a wall, floor or ceiling, or a sloping part for a building. The ply includes a juxtaposition of strips, either structural strips or filling strips, positioned between the structural strips and made of a different material from that of the structural strips. The materials are selected for the thermal or acoustic insulation thereof, the thermal inertia thereof or the fire resistance thereof. Each lateral movement of a ply being produced with respect to the assembly plane is carried out by the synchronized movement of a table with which the lower face of the ply is in contact and a driver with which the upper face of the ply is in contact. There is an installation for implementing the method according to the invention.

3 Claims, 1 Drawing Sheet

(56) References Cited

U.S. PATENT DOCUMENTS 2,488,759 A     11/1949   Bolling
2,657,160 A     10/1953   Croston
3,773,604 A * 11/1973   Desai ..................... F17C 3/022
                                                          220/560.05

* cited by examiner

METHOD AND DEVICE FOR PRODUCING A PLY INVOLVED IN THE CONSTRUCTION OF A MULTI-PLY PANEL

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the construction of buildings. It relates more particularly to a method for producing a multi-ply panel for forming a floor or a wall or an inclined roof, or for forming an addition for a wall, for example in order to improve its heat and/or sound insulation, or its fire-resistance. It also relates to a method for producing a layer for such a panel. Such processes can also be referred to as lamination processes.

2. Description of Related Art Including Information Disclosed Under 37 CFR 1.97 and 37 CFR 1.98.

Many materials have been proposed for forming walls, or additions for walls, in order to improve their heat and/or sound insulation, or their fire-resistance. With the entering into force of new standards RT 2012, RT 2020 to come and labels, the requirements change, and it is therefore necessary to be able to provide different qualities for walls or additions for walls. In addition, the necessary quality is not the same for inner or outer walls, ceilings, inclined roofs, and depending on the type of construction, the requirements change too. This obliges the provider of panels or materials to provide a large amount of references in order to be able to meet all the needs.

In order to meet these needs, the applicant has proposed, in a previous patent application, a multi-ply panel for forming or as an addition for a wall, a floor or ceiling, or an inclined surface of a building, formed of a stack of layers formed of parallel structural strips, preferably of wood, and filler strips arranged between the structural strips and made of a material different from that of the structural strips, whereby said materials can be selected for their heat or sound insulation, their thermal inertia or fire-resistance.

However, the manufacture of such panels is not easy. The handcrafted methods permit to manufacture them, but are time-consuming and expensive. The known industrial processes only permit the manufacture of layers formed of one type of strips, and are not suitable for the manufacture of a panel the layers of which are formed of several types of strips. If an assembling method suitable for wood is applied, the strips made of rock wool are crushed by excessive pressure. On the contrary, if lower pressures are applied, the adhesive joint between two strips of wood does not reach the desired strength. Furthermore, the known methods do not permit the production of panels with integrated openings. On the contrary, such openings must be cut into the panel when it has been assembled, which results into significant material wastes.

SUMMARY OF THE INVENTION

The aim of the present invention is to cope at least partially with these drawbacks. To this end, it provides a method for manufacturing a layer forming part of a multiply panel for forming or as an addition for a wall, a floor or ceiling, or an inclined surface of a building, said layer being formed of a juxtaposition of strips, said strips being either structural strips, preferably made of wood, or filler strips arranged between the structural strips and made of a material different from that of the structural strips, whereby said materials can be selected for their heat or sound insulation, their thermal inertia or their fire-resistance, said method comprising the following steps:

placing a first strip on a table, a first side edge against a stop, the second side edge according to a predefined strip assembling plane and forming a reference mark, sizing the first side edge of a second strip, contacting by means for contacting said first side edge with the second edge of the first strip on the assembling plane, thus forming an assembly of two strips, and the second side edge, not sized, of the second strip forming the end edge of the layer being produced, moving said layer being produced sidewise with respect to the assembling plane, until the end edge of the layer being produced corresponds to the assembling plane, sizing the first side edge of a third strip, and so on, until all of the strips of the layer are assembled.

This method is particular in that each lateral displacement of said layer being produced relative to the assembling plane is performed by the synchronized displacement of the table, which the layer being produced is into contact with by its lower face, and a driving means, which the layer being produced is into contact with by its upper face.

Thanks to these arrangements, the layer being produced is perfectly maintained, without exerting any pressure likely to deteriorate the filler strips; this thus permits to assemble a layer with strips having very different characteristics, some of these strips being unable per se to maintain the strips adjacent; this method permits in addition to form a layer with openings.

According to further features:

said table can be movable in rotation between two perpendicular positions, thus permitting to produce longitudinal layers and transverse layers with the same table, said synchronized displacement of the table and the driving means can in addition be accompanied by the displacement, also synchronized, of the contacting means, such as to accompany the displacement of the strip that has just been brought into contact, at least one strip of the layer can be divided into at least two parts, such as to leave a gap between said two parts, said gap being aimed at forming an opening in the entire layer, for example, for a window or a door.

The invention also relates to a method for producing a multi-ply panel for forming or as an addition for a wall, a floor or ceiling, or an inclined surface of a building, said panel being formed of a stack of layers, at least one layer of which is formed of parallel structural strips, preferably of wood, and filler strips arranged between the structural strips and made of a material different from that of the structural strips, whereby said materials can be selected for their heat or sound insulation, their thermal inertia or fire-resistance, wherein it comprises the following steps:

preparing structural strips and filler strips, producing a layer by means of a method according to the invention, conveying without deformation of said layer to a pressing area by means of a means for conveying without deformation, assembling by gluing said layer with other layers, in order to form a panel, machining to the final dimensions of the panel.

Thanks to these arrangements, the method according to the invention permits the industrial and automated manufacturing of panels comprising mixed strips, which permits to produce such panels with all their variants of characteristics at competitive prices.

According to further features:

said conveying means can be configured capable of exerting a porting force on each strip of the layer; this permits to form a layer with strips of a different nature, and namely with a mixture of structural strips and filler strip, the filler strips being not stressed beyond their own weight, the step of preparation of the structural strips can comprise a planing on four faces, such as to improve the geometric accuracy of said strips, thereby permitting a sufficient contact for gluing, without requiring the application of a pressure the filler strips would not be able to withstand, the step of preparation of the filler strips can comprise a jointing of several strips, thus permitting an optimal use of the raw material, said assembling by gluing of said layer with other layers can be performed with a press controlled by a clamping value to be obtained, regardless of the pressure to be exerted, such as to guarantee the contact between the structural strips of two adjacent layers; indeed, the filler strips can then have a less calibrated thickness, which facilitates their preparation, only the structural strips being calibrated in thickness, and the press is controlled based on the thickness of the structural strips; the filler strips are compressed, and the gluing joint between structural strip is guaranteed, said machining to the final dimensions of the panel can be performed by a 6-face machining center, which permits to avoid additional manipulations of the panel, which would be a waste of time and a risk of deterioration, and which also permits to improve the accuracy of said panels, since a repositioning of the panel between the machining of two different faces is avoided.

The present invention also relates to a device especially adapted to implement the method according to the invention. This device is particular in that it comprises a reference mark forming an assembling plane, a table movable in translation relative to said reference mark, and a means for putting into lateral displacement through contact on the upper face of a layer to be manufactured, said means for putting into displacement being capable of having a movement synchronized with the displacement of said table relative to said reference mark.

The reference mark can be movable in lateral translation and the table can be fixed, which has however the drawback of making the industrial installation more difficult, namely the supply with structural and filler strips.

According to further features:

said assembling plane can be fixed, thus permitting a supply with strips always at the same place, said means for putting into lateral displacement can comprise belts wound on three cylinders, and designed so that one of the strands of said belts is parallel to said table, and capable of performing a movement synchronized with said table relative to said assembling plane, thus forming a simple and robust solution said table can furthermore be movable in rotation between two perpendicular positions, thus permitting to produce longitudinal and transverse layers with the same table.

The invention finally relates to a plant designed specifically for producing a multi-ply panel comprising a device for producing a layer according to the invention, and wherein said means for conveying without deformation comprises rows of suction means capable of being applied onto the top of an entire layer and of lifting it, said rows being inclined with respect to the direction of the strips, irrespective of their being longitudinal or transverse, such as to ensure a proper gripping of each strip in longitudinal position and in transverse position.

The advantage provided by the present invention resides mainly in that it becomes possible to manufacture industrially, and therefore at competitive costs, panels of highly varied composition, and also with varied materials. The present invention thus permits the implementation of improved panels in the building industry.

The present invention will be better understood when reading the following detailed description, which is given by way of examples, whereby these examples may not be interpreted as narrowing the scope of the invention.

The present invention will be better understood when reading the following detailed description, with reference to the attached figures.

DETAILED DESCRIPTION OF THE DRAWINGS

Figure 1:
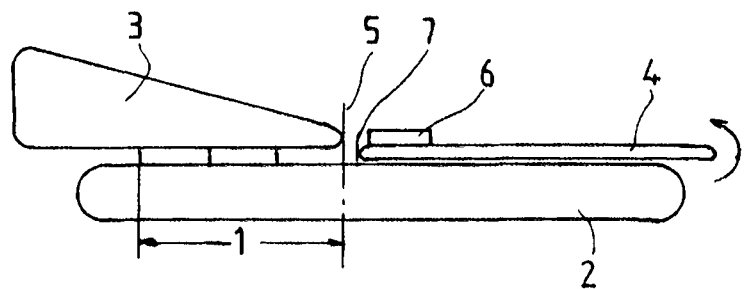
FIG. 1 shows a profile schematic view of a device according to the invention during a first step of production of a layer.

The characteristics of the layers and products forming the layers can be as follows:

The layers have a maximum length of 8500 mm, and a minimum length of 2000 mm, a maximum width of 3500 mm and a minimum width of 2000 mm, a maximum thickness of 50 mm and a minimum thickness of 25 mm, for example 45 mm.

The weight of a 100% wood layer with the maximum thickness of 50 mm is 803 Kg.

The layers can be formed of declining rows (strips), for example in order to form a pinion. The raw openings for windows, doors or reservations are inscribed in the layer, without ever ending onto the periphery of the layer. The minimum distance separating an opening from the periphery of a layer is 300 mm. The minimum distance between two openings is 300 mm.

The layers are namely formed of a maximum of three different strip materials. The strips made of wood are generally of the same width in a layer. The insulating strips are usually of the same material and of the same width in a layer, sometimes of two different materials, seldom more. An insulating strip of the same material can be cut to the useful width.

Irrespective of the product, it has preferably a rectangular cross-section and is cut straight at the ends.

A layer is formed of parallel rows (strips), bonded together by one or more beads of glue on one edge; a hot-melt glue is an example of well-suited glue for this application. A row can be formed of one single strip having the length of the layer or of two strips separated by an opening, or also of three strips separated by two openings.

In a row formed of two or three strips separated by one or several openings, the latter will preferably have the same cross-section.

An insulating strip can be formed of several segments 1 glued together by a bead of glue, for example hot-melt, at one end. One will preferably work with segments of a minimum length of 300 mm.

The paneling function does not correct the deformations of the components such as arch, helix or out of level. In order to avoid arches and ensure a proper leveling, the structural strips are machined during their phase of preparation, in order to confer them accurate dimensions and shapes. As regards the helix, the gluing at the level of the paneling (assembling of a layer) should have a sufficient strength in order for an adjacent strip to accompany the deformation of the helix, so that the latter can be neutralized at the time of assembling by gluing the layers to each other to form the panel.

An average layer can have the following dimensions and characteristics:
  Strips of wood with cross-section 150×30 mm.
  Rectangular peripheral geometry.
  Length 6500 mm.
  Width 3200 mm.
  1 opening for window.
  1 opening for door.
  1 Row formed of insulation made to measure.
  Insulating layer, 20% of wood & 80% of rock wool.
  Structural layer, 50% of wood and 50% of graphite PSE, or fiberglass
  Any other adhesive with equivalent characteristics and supplied in similar packaging can be used.

The characteristics of the wafers can for example be as follows:

A wafer, defined as an assembly of similar layers, a panel being an assembly of a few wafers, is formed of 2 to 10 layers generally intersecting at 90°. A wafer is formed of layers of the same size, having the same openings, eventually except for a rabbet offset, and aligned in their stacking. The layers are glue-bonded together by means of beads applied at least on the contact areas of the wood, for example with a structural or non-structural single-component or two-component PUR cold glue, according to the application.

The wafers can be rather insulating, structural or mixed. Their overall length may vary for example between a maximum dimension of 8500 mm and a minimum dimension of 2000 mm. Their overall width may vary for example between a maximum dimension of 3500 mm and a minimum dimension of 2000 mm. Their thickness may vary for example between a maximum dimension of 300 mm and a minimum dimension of 50 mm.

The weight of a 8500 mm long, 3500 mm wide and 300 mm thick wafer is approximately 2800 kg with 50% of wood.

After pressing, the wafers can be machined and provided with equipment.

The adhesive used for forming the wafers can be:
  either a single-component PUR cold glue, with the following characteristics: PURBOND™ glue HB S-Line HB S109 to HB S309, base packaged in 1000 Kg tank, temperature: min. 18° C., ideal 20° C.,
  or a two-component PUR cold glue, with the following characteristics: KLEIBERIT™ 2C PUR 541.6 glue+3-20% activator, base packaged in 1000 Kg tank, activator in 250 kg container, adjustable application rate of the mixture,
  any other glue with equivalent characteristics.

The panels can be produced in one operation, as a wafer, or by assembling wafers, or by assembling wafers with additional layers. During the assembling of the wafers or of wafer with additional layers, the visible faces preferably intersect at 90°.

The wafers and layers assembled in order to form a panel can be glued with the same glue and according to the same method as during the composition of a wafer.

In the case of using the two-component glue, the different 4 open times can be controlled automatically depending on the type of wafer being formed, in order to optimize the production.

In the case of using the single-component glue, it has a constant open time. A second circuit for applying the single-component glue can be provided, which has a different open time, which permits to optimize the production by selecting the application of the glue having the most appropriate open time for the wafer being produced.

The assembled wafers and layers have the same geometry, with the same openings, but with different formats, in order to create the raw assembly nesting and the rough rabbets in the openings.

In the case of assembling layers on a wafer, the layer overhangs, depending on their size, can be supported by wedging the thickness of the wafer and the surface of the overhang in order to guarantee a proper pressing.

The base of a finished wall must be rigid enough to withstand a vertical handling.

The offsets of the layers or wafers during the assembling are for example smaller than or equal to 300 mm.

The weight of a panel can be 3500 Kg.

In the following is explained an example of the operating principle of the inventive method.

For each panel launched into production, a file is generated by the CAD, in XML or BTL type format, and transmitted over the Ethernet network or uploaded by means of a USB key to the main PC. The monitoring system is dimensioned to take over the distribution of production information, the follow-up and the traceability of the manufacturing of the panels. The apparatus and finishing parameters of the panels are re-distributed to the operators.

Said file contains all the information useful for the manufacture of the panel from the first to the last step. This file is converted, for one part into text files for the machines, for another part into a production list for the manual stations.

When launching the production of a layer, the strip lengths are called onto each automatic cutting line, the strip width and length to measure is displayed on the dedicated station.

The wooden strips are always of one length. The insulating strips are made of one or several pieces jointed simply by gluing at the end.

If the required strip length is longer than the insulating strip length inserted into the cutting saw, an extra length is cut in the following insulating strip length.

The sizing of the end of the second and following pieces, if applicable, occurs during the ejecting of the web leaving the cutting saw.

When the remaining length is shorter than 300 mm, it is ejected as waste.

Once they are available, the strips are loaded in order of formation, taking into account the gradual decrease of the rows and the lower portion of the final panel.

The strips are glued vertically on their upper edge, then positioned longitudinally on digitized stops. One, two or three strips can be loaded successively to form a row, then they are tilted into flat position and applied laterally against the preceding ones.

The first row is positioned against a reference mark rule, the positioning of the following ones is ensured by the digitized shift of the composition table, synchronized with application and upper strip-pressing systems.

Figure 2:
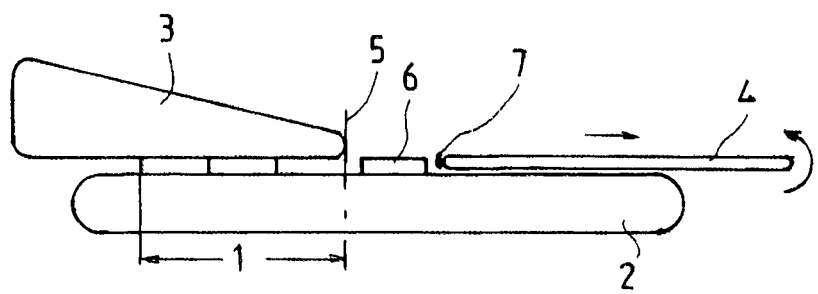
FIG. 2 shows a schematic view of the device of FIG. 1 during a second step of production of a layer.
Figure 3:
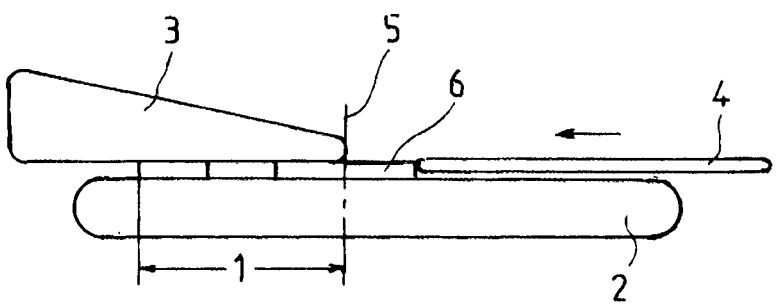
FIG. 3 shows a schematic view of the device of FIG. 1 during a third step of production of a layer.
Figure 4:
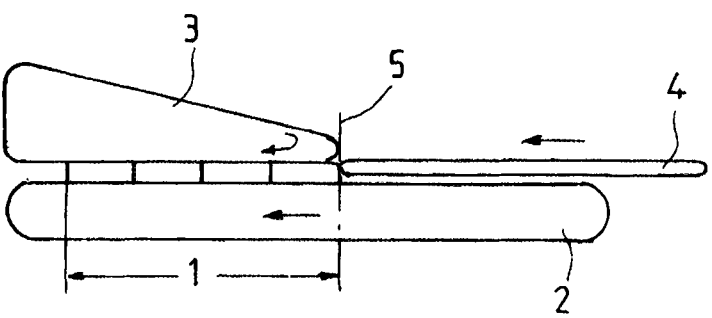
FIG. 4 shows a schematic view of the device of FIG. 1 during a fourth step of production of a layer.

As can be seen in FIGS. 1 to 5, the layer being produced 1 is arranged on the table 2, maintained under the upper pressing system 3. The upper pressing system can be formed of a set of strips wound around three cylinders, one of the strands of the strips being parallel to the table, and capable of exerting a bearing force on the layer being produced 1. The supply and application system 4 is formed of a set of conveyors parallel to the table 2. These conveyors transport the strips 6 (two or three strips, in case of presence of an opening in the layer being produced) in flat position 5 until the assembling plane. The end of the conveyor 4 is arranged proximate said assembling plane 5 and the conveyor is running to bring the strips to the assembling plane 5. As soon as the sized edge of the strips arrives in the proximity of the assembling plane 5, the conveyor 4 starts to move backward while, continuing to run, which causes the strips to be placed on the table 2 (FIG. 2). As soon as the placing is completed, the conveyor 4, with a rule 7 at its end, brings the strips 6 into contact with the layer being produced 1, by pushing, then applying a slight pressure for bringing into contact (FIG. 3). Then occurs a synchronized movement of both lateral displacement of the table 2 and starting of the conveyors of the upper pressing means 3, such as to move the layer being produced, which has now been enlarged with one row of strips, without any stress in the adhesive joints and without deformation, until the new end of the layer being produced is in front of the assembling plane 5. Preferably, the displacement of the conveyors of the supply and application system 4 is added, in order to maintain the strips into contact with the layer being produced 1 until the strip is also well taken by the upper pressing means 3 (FIG. 4).

In FIGS. 1 to 4, the table is shown in its longitudinal direction, and may have a length of about 10 meters. This arrangement permits to produce a layer with for example dimensions of 8 m by 3 m, transverse, with a greater number of strips having a length of 3 m.

Figure 5:
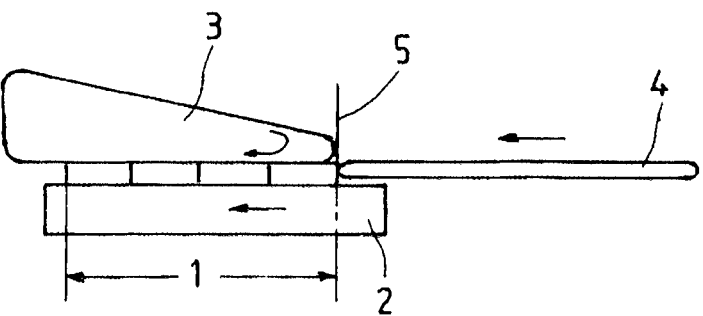
FIG. 5 shows a schematic view of the device of FIG. 1 with the table rotated by 90°, for the production of a longitudinal layer, during the step corresponding to that of FIG. 4 of the production of a layer. invention.

FIG. 5 shows the same step as FIG. 4, but with the table shown in its transverse direction, in which it has for example a width of 4 meters. This arrangement permits to produce a layer, for example with dimensions of 8 m by 3 m, longitudinal, with a smaller number of strips having a length of 8 m.

The table 2 can be provided with means for rotating about a vertical axis in order to pass from the transverse position into the longitudinal position.

Two different devices can also be provided, one for producing the longitudinal layers and the other one for producing the transverse layers.

The application of the layers onto each other is performed under the pressing system, in order to ensure a tack and a setting of the adhesive between flush parts.

The upper pressing of the strips during the sizing between the strips permits to always maintain flush the insulating strip and wooden strips, including when the latter exhibit a helix-like defect, this until the assembling of the layers.

Once the layer is completed, it is oriented in the proper direction and transferred onto the transfer shuttle to the assembling area. It can be provided, in order to facilitate this transfer, that the table 2 is equipped with a conveyor belt covering the entire surface of the table, and the function of which is this transfer onto the shuttle.

The layers leaving this panel-producing machine are positioned longitudinally before they are gripped and stored on the intermediate tables.

Once all the layers are available for forming a wafer, the first layer is inserted onto the sizing table.

The sizing and placing passes are alternated until the composition of the wafer is completed.

For the handling of a layer, it is important to use a conveyor means without deformation, which permits to avoid a deterioration of the filler strips, as well as a separation of the glued joints between the strips, and this even if the layer has large openings. Therefore, a machine for gripping by means of suction cups has been developed, which is configured such that each structural strip engages with several suction cups. To this end, rows of suction cups are arranged, said rows being inclined with respect to the direction of the strips, which permits a good gripping of each structural strip, irrespective of the layer being transverse or longitudinal.

The wafer being prepared is inserted into the press, which may comprise 2 levels. The wafers to be machined are inserted onto the machining center for a complete machining of one or two faces. The machined wafers are then transferred onto the equipment table.

A machined wafer can be assembled with a layer or a raw wafer. Two machined wafers can be assembled together and the operation can be repeated, if necessary, within the limits of the total allowable thickness, which can for example be of 600 mm.

Once it has been assembled, a panel can go through a final machining, or not.

The panels then pass onto a first table, in order to permit operations of touch-up treatment, placing of the additional accessories, stapling of the vapor barrier and nailing inner battens.

Then, then panels are returned from that table onto a second table, to permit operations of placing of additional accessories, stapling of rain screen and nailing of external battens.

Before putting them upright, the operator can attach two guiding rods.

The so prepared panels are then stored, distributed to the different carpentry-placing and finishing stations.

The layers produced according to the invention are often layers that include both strips of wood and insulating strips. The insulating strips are much less resistant than the strips of wood, and the whole layer, once the strips have been assembled by gluing, do not have a good strength, so that the layer must be handled with great care. For this purpose can be provided an equipment as follows:

For the layers, a modular belt conveyor, with a length of 10.700 mm, a useful width of 3800 mm, with a varying moving speed on the belt, and one single direction of travel, a lateral measuring rule, a safety stop at the end.

Of course, any table of a different type, movable in translation for forming a layer, is also suitable. The starting of the belt serves for evacuating the finished layer and, here too, another means for evacuating the layer may be applied without departing from the scope of the present invention. The table can be movable in rotation between two perpendicular positions, such as to be able to produce the longitudinal and transverse layers with the same table in the two positions, but two separate tables can also be provided, one for the longitudinal layers, the other one for the transverse layers, without departing from the scope of the invention.

A layer storage station, with a machine-welded and stabilized bearing structure, two ranges of storage, a flat and perforated anti-slip bearing surface with a load capacity of 10 layers per range.

For the paired structural wafers, a modular belt conveyor, with a length of 11,700 mm, a useful width of 3800 mm, with a variable and digitized speed of movement on the belt, and two directions of travel, a lateral measurement rule, a safety stop at the end.

A manipulator for transferring and applying the layers and wafers, two machine-welded rolling gantries, with a length of 27,000 mm, stabilizers laterally to the station (B20), a digitized double-girder translation carriage, with a travel length of 20,000 mm, a vacuum gripping cross-bar equipped with self-closing boxes and a vacuum generated by a soundproof turbine.

The vertical travel length of the cross-bar can be of 1200 mm and progressive starting and stopping of the lifting and translating movements can be foreseen.

As regards the pressing of the wafers, a particularly suitable equipment should also be provided in order to ensure a good contact of the structural strips of two successive layers, even if the insulating filler strips have a slightly larger thickness. Equipment as follows can for example be provided.

A mechanical single-level press, with a machine-welded general structure designed for two levels, but associated with a lower level, a lower press formed of a lower conveyor that rises under pressure onto a fixed upper plate, a belt conveyor with a length of 9,300 mm, and a useful width of 3800 mm, a variable speed of movement on the belts, a passing through of 650 mm, open press, a press with parallel displacement ensured by means of a mechanical balancing, a pressure obtained by automatic control of closing depending on a predetermined clamping measure of the panel, adjusted according to the composition of the panel and the desired specific pressure.

The pressure to be considered on the total area of 8500× 3500 mm can be of two DaN/cm$^2$.

Although the invention has been described in a particular embodiment, it is in no way limited thereto, and variations can be made, as well as combinations of the described variants, without departing from the scope of the present invention.

We claim:

1. A method for manufacturing a layer forming part of a multi-ply panel of a building, the method comprising the steps of:
    preparing a structural strip having a first structural side edge and a second structural side edge opposite said first structural side edge, said structural strip being comprised of a structural material selected for at least one of a group consisting of: heat insulation, sound insulation, thermal inertia, and fire-resistance;
    preparing a filler strip having a first filler side edge and a second filler side edge opposite said first filler side edge, said filler strip being comprised of a filler material selected for at least one of a group consisting of: heat insulation, sound insulation, thermal inertia, and fire-resistance, said filler material being different from said structural material;
    placing said structural strip on a table, said first structural side edge against a stop, and said second structural side edge according to a predefined strip assembling plane so as to form a reference mark;
    aligning said first filler side edge of said filler strip to said second structural side edge of said structural strip;
    contacting said first filler side edge of said filler strip with said second structural side edge of said structural strip on the assembling plane so as to form an assembly, said assembly being a layer having a lower face, an upper face, and an end edge, said end edge being comprised of said second filler side edge when said assembly is comprised of said structural strip and said filler strip;
    moving said layer relative to the assembling plane by a lateral displacement so as to align said end edge of said layer on the assembling plane,
    wherein said lateral displacement is performed by a synchronized lateral displacement of said table, wherein said lower face of said layer contacts said table, and wherein said upper face of said layer contacts a pressing drive system,
    repeating the steps of placing, aligning, contacting, and moving with an additional strip having a first additional side edge and a second additional side edge opposite said first additional side edge, said additional strip being comprised of an additional material, said additional material alternating between said structural material and said filler material according to a most recent strip in said assembly.

2. The method, according to claim 1, wherein said lateral displacement and said synchronized lateral displacement of said table correspond to an additional synchronized movement of said pressing drive system.

3. The method, according to claim 1, wherein at least one strip of a group consisting of said structural strip, said filler strip, and said additional strip is comprised of two parts and a gap between said two parts so form an opening in said layer.

* * * * *